(12) United States Patent
Reeves et al.

(10) Patent No.: US 12,170,592 B2
(45) Date of Patent: Dec. 17, 2024

(54) AUTOMATED INSPECTION OF NETWORK STATE

(71) Applicant: T-Mobile USA, Inc., Bellevue, WA (US)

(72) Inventors: Raymond E. Reeves, Orlando, FL (US); Jorge Climaco Toledo, Kansas City, KS (US); Henry Rico Olivas, Somerton, AZ (US); Hector M. Rodriguez Riego, Atlanta, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 51 days.

(21) Appl. No.: 17/731,098

(22) Filed: Apr. 27, 2022

(65) Prior Publication Data

US 2023/0208709 A1    Jun. 29, 2023

Related U.S. Application Data (63) Continuation-in-part of application No. 17/562,824, filed on Dec. 27, 2021, now Pat. No. 11,950,123.

(51) Int. Cl.
*H04L 41/0813* (2022.01)
(52) U.S. Cl.
CPC .............................. *H04L 41/0813* (2013.01)
(58) Field of Classification Search
None
See application file for complete search history.

(56) References Cited

U.S. PATENT DOCUMENTS

| | | | |
|---|---|---|---|
| 7,231,330 B2 | 6/2007 | Hernandez-mondragon et al. |
| 7,623,504 B2 | 11/2009 | Phu |
| 8,279,810 B1 | 10/2012 | Li et al. |
| 8,423,637 B2 | 4/2013 | Vaswani et al. |
| 8,588,801 B2 | 11/2013 | Gorokhov et al. |
| 8,707,458 B2 | 4/2014 | Malaney |
| 8,769,308 B2 | 7/2014 | Mukherjee et al. |
| 8,861,494 B2 | 10/2014 | Mukhopadhyay |
| 8,938,525 B2 | 1/2015 | Magnusson et al. |
| 8,942,696 B2 | 1/2015 | Vukajlovic Kenehan et al. |
| 9,113,352 B2 | 8/2015 | Agarwal et al. |

(Continued)

FOREIGN PATENT DOCUMENTS

| CN | 101932120 B | 9/2013 |
|---|---|---|
| CN | 103327526 B | 7/2017 |

(Continued)

*Primary Examiner* — Atta Khan
(74) *Attorney, Agent, or Firm* — Perkins Coie LLP (57) ABSTRACT

Systems, methods, and devices that relate to an inspection system deployed in a core network. The inspection system includes one or more inspection agent nodes located close to an edge of the core network configured to generate one or more network reports based on information from one or more access nodes. An inspection manager node is in communication with the one or more inspection agent nodes to receive one or more network reports from the one or more inspection agent nodes, derive an actual network behavior of the one or more access nodes based on the one or more network reports, detect a discrepancy between an expected network behavior and the actual network behavior, and trigger a reconfiguration of at least one of the one or more access nodes based on the discrepancy.

15 Claims, 10 Drawing Sheets

RAN Nodes (56) References Cited

U.S. PATENT DOCUMENTS

| | | |
|---|---|---|
| 9,154,987 B2 | 10/2015 | Redana et al. |
| 9,438,521 B2 * | 9/2016 | Kazmi ................ H04L 43/0829 |
| 9,615,304 B2 | 4/2017 | Breuer et al. |
| 9,661,441 B2 | 5/2017 | Da et al. |
| 9,661,585 B2 * | 5/2017 | Boudreau ............. H04W 24/10 |
| 9,749,926 B2 | 8/2017 | Müller et al. |
| 9,860,810 B2 | 1/2018 | Rahman et al. |
| 9,924,389 B2 | 3/2018 | Siomina et al. |
| 9,961,560 B2 | 5/2018 | Farkas et al. |
| 10,034,189 B2 | 7/2018 | Futaki et al. |
| 10,057,802 B2 | 8/2018 | Gunnarsson et al. |
| 10,075,466 B1 | 9/2018 | Oliphant et al. |
| 10,111,123 B2 | 10/2018 | Rune et al. |
| 10,194,343 B2 | 1/2019 | Breuer et al. |
| 10,476,714 B2 | 11/2019 | Zhang et al. |
| 10,506,543 B1 | 12/2019 | Edge et al. |
| 10,743,276 B2 | 8/2020 | Papa et al. |
| 2006/0218271 A1 | 9/2006 | Kasslin et al. |
| 2006/0253526 A1 | 11/2006 | Welch et al. |
| 2013/0190006 A1 | 7/2013 | Kazmi et al. |
| 2013/0303145 A1 | 11/2013 | Harrang et al. |
| 2015/0195730 A1 | 7/2015 | Siomina et al. |
| 2015/0319634 A1 | 11/2015 | Zwirn |
| 2015/0358920 A1 | 12/2015 | Sorrentino et al. |
| 2015/0373561 A1 * | 12/2015 | Huang .................... H04L 43/16 |
| | | 370/252 |
| 2016/0135132 A1 | 5/2016 | Donepudi et al. |
| 2016/0219473 A1 | 7/2016 | Teyeb et al. |
| 2016/0262111 A1 * | 9/2016 | Boudreau ........... H04W 52/383 |
| 2018/0234153 A1 | 8/2018 | Lincoln et al. |
| 2019/0191293 A1 | 6/2019 | Nelson et al. |
| 2019/0373301 A1 | 12/2019 | Gunasekara et al. |
| 2020/0092685 A1 * | 3/2020 | Fehrenbach ........ H04W 84/005 |
| 2020/0128448 A1 | 4/2020 | Müller |
| 2021/0105680 A1 | 4/2021 | Nilsson |

FOREIGN PATENT DOCUMENTS

| | | |
|---|---|---|
| CN | 104272637 B | 10/2018 |
| EP | 3174329 B1 | 11/2020 |
| EP | 3764685 A1 | 1/2021 |

* cited by examiner

AUTOMATED INSPECTION OF NETWORK STATE

CROSS REFERENCE TO RELATED APPLICATIONS

This patent document is a continuation-in-part of and claims priority to U.S. patent application Ser. No. 17/562,824, filed on Dec. 27, 2021. The entire contents of the before-mentioned patent application are incorporated by reference as part of the disclosure of this document.

BACKGROUND

Mobile communication technologies are moving the world toward an increasingly connected and networked society. With the use of advance wireless communication techniques, accurate alignment of the intended configurations and the actual deployment of such techniques is needed to provide reliable network services and better user experiences.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

To provide high throughput, wider coverage, and optimal user experience to users, the actual deployment of the network resources (e.g., antenna elements, carrier configurations, power features) needs to be accurately aligned with the intended configurations. However, conventionally, achieving such accuracy can be a challenging task; the troubleshooting and repair actions can be very expensive and time-consuming. Engineering teams have to dedicate financial and time resources to inspect and correct unexpected deployment configurations. Inaccuracy may still exit in the system even after laborious effort, leading to signal deterioration and usage drop.

This patent document discloses techniques that can be implemented to provide automated inspection of the network systems so as to determine if discrepancies between the actual states and the intended configurations exist in the systems. The disclosed techniques also enable automatic reconfiguration of the system at appropriate times to minimize interruptions to the networks and improve overall experience for the users.

Figure 1:
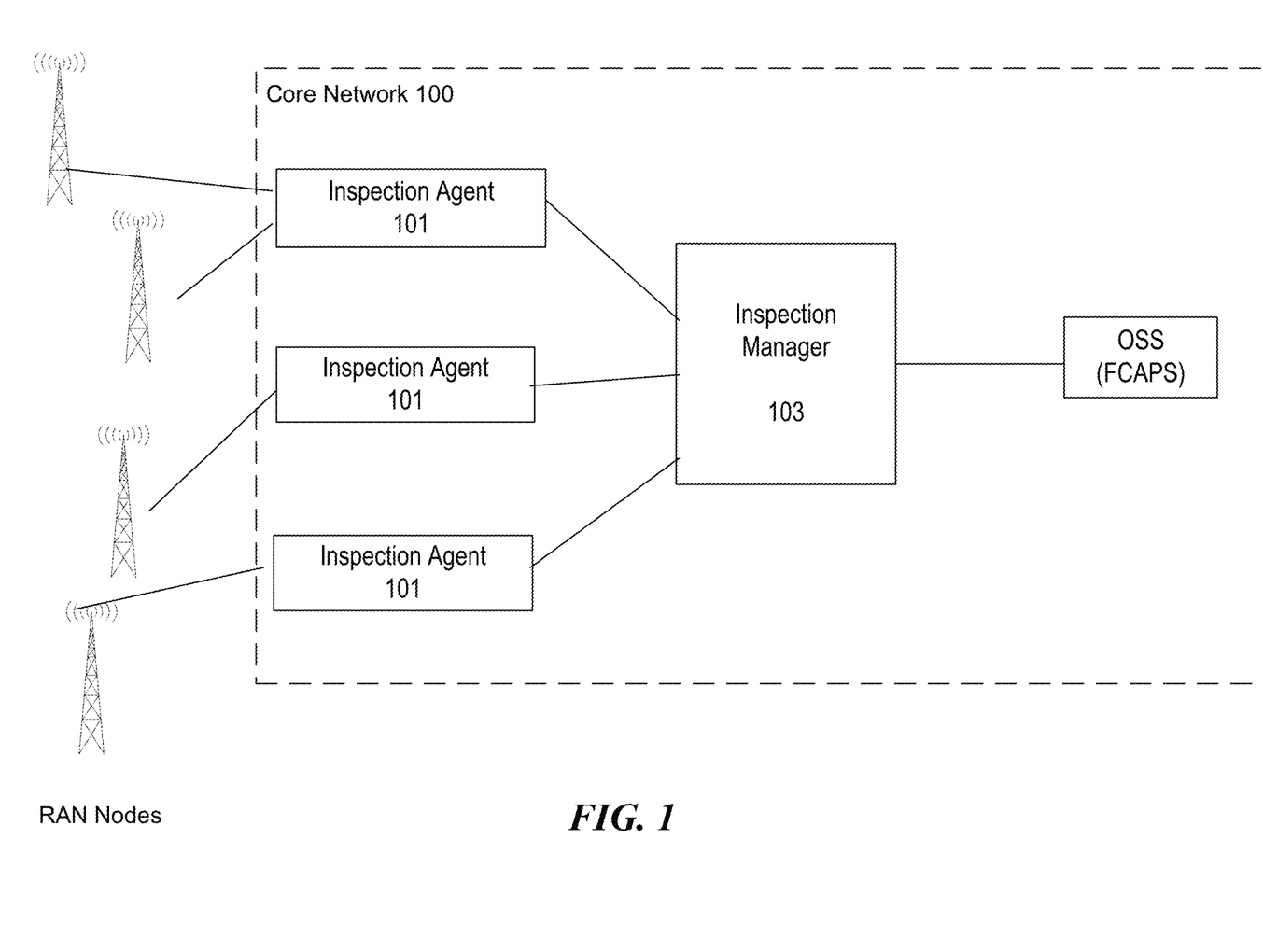
FIG. 1 illustrates an example architecture of a core network accordance with one or more embodiments of the present technology.

To enable automatic detection and correction of configuration discrepancies, an inspection system can be deployed by the network operator(s) in the core network to track and update the network configurations when needed. FIG. 1 illustrates an example architecture of a core network accordance with one or more embodiments of the present technology. In some embodiments, the core network 100 can include multiple inspection agents 101 that are in communication with the Radio Access Nodes (RANs) (also referred to as base stations). The inspection agents 101 can be deployed in a distributed manner close to the edge of the core network 100 to collect measurement results from the User Equipment (UE) via the RANs or other types of feedback information from the RANs. In some embodiments, the inspection agents 101 can generate geo-located reports based on the location of the UEs and the RANs. The inspection system also includes an inspection manager 103 that receives information from the inspection agents 101 and consolidates the information to determine the network events and/or configurations. For example, based on the collection information, the inspection manager 103 can determine whether a RAN has been added or removed from the network. The inspection manager 103 can also determine whether there is any discrepancy between the actual behavior and the expected behavior of the network node(s) and trigger updates accordingly.

Figure 2A:
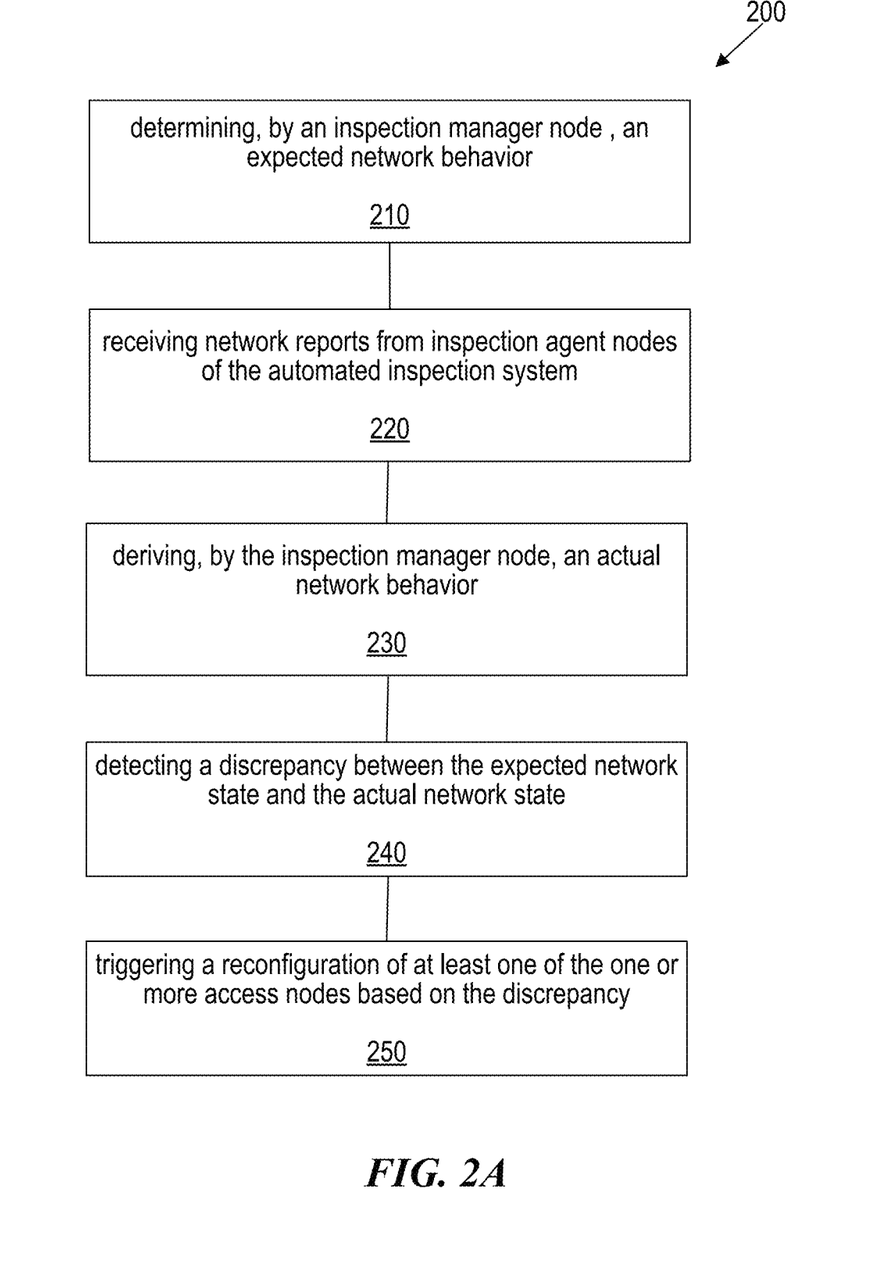
FIG. 2A is a flowchart representation of a method for wireless communication in accordance with one or more embodiments of the present technology.

FIG. 2A is a flowchart representation of a method for wireless communication in accordance with one or more embodiments of the present technology. The process 200 includes, at operation 210, determining, by an inspection manager node of an automated inspection system in a core network, an expected network behavior based on predefined configuration information. The process 200 includes, at operation 220, receiving, by the inspection manager node, one or more network reports from one or more inspection agent nodes of the automated inspection system. The one or more inspection agent nodes are located close to an edge of the core network and the one or more network reports are generated based on geo-locations of one or more wireless devices in communication with one or more access nodes. The one or more network reports includes information about measurements from the one or more wireless devices and network events observed by the one or more access nodes. The process 200 includes, at operation 230, deriving, by the inspection manager node, an actual network behavior based on the one or more network reports, The process 200 includes, at operation 240, detecting, by the inspection manager node, a discrepancy between the expected network behavior and the actual network behavior. The process 200 also includes, at operation 250, triggering, by the inspection manager node, a reconfiguration of at least one of the one or more access nodes based on the discrepancy.

In some embodiments, the method includes notifying, by the inspection manager node, an operating support system of the discrepancy between the expected network behavior and the actual network behavior. In some embodiments, the triggering comprises triggering the reconfiguration of at least one of the one or more access nodes in a time duration in which data traffic is below a predetermined threshold. For example, reconfiguration of the RANs can happen after midnight when the data traffic in the network falls below a predefined threshold (e.g., 30%), thereby minimizing interruption to regular network services.

Figure 2B:
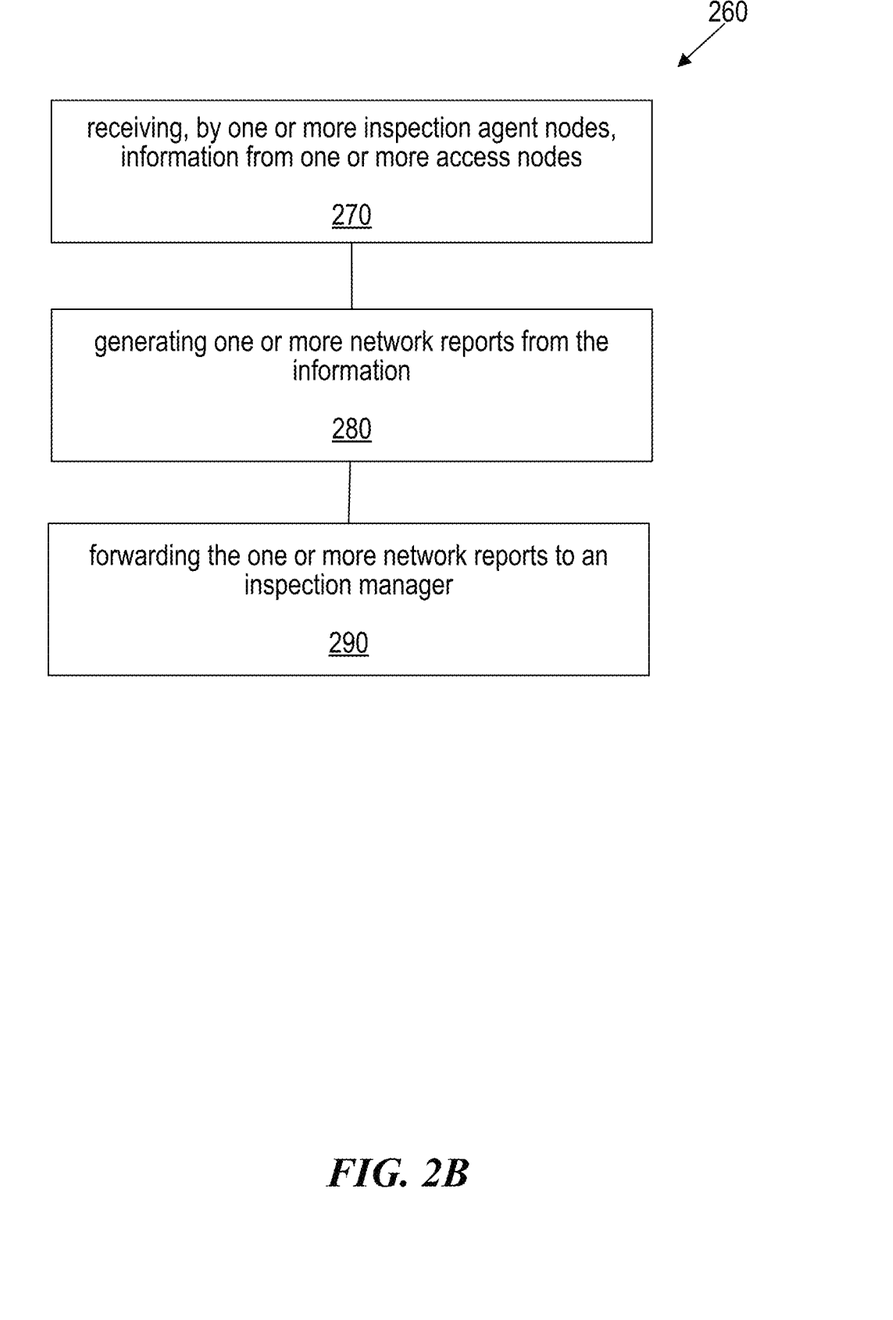
FIG. 2B is a flowchart representation of a method for wireless communication in accordance with one or more embodiments of the present technology.

FIG. 2B is a flowchart representation of a process 260 for wireless communication in accordance with one or more embodiments of the present technology. The process 260 includes, at operation 270, receiving, by one or more inspection agent nodes of an automated inspection system in a core network, information from one or more access nodes in communication with one or more wireless devices. The information comprises network events observed by the one or more access nodes and measurement results from the one or more wireless devices. The process 260 includes, at operation 280, generating one or more network reports from the information based on geo-locations of the one or more wireless devices. The process 260 includes, at operation 290, forwarding the one or more network reports to an inspection manager of the automated inspection system.

In some embodiments, the one or more inspection agent nodes are located close to an edge of the core network. In some embodiments, the receiving of the information comprises periodically receive the measurement results from the one or more wireless devices via the one or more access nodes. In some embodiments, the measurement results comprise measurements performed per Synchronization Signal (SS)/physical Broadcast Channel (PBCH) block or per Channel State Information (CSI) Reference Signal (RS), and the network events comprise at least one of a Radio Resource Control (RRC) reconfiguration, a handover command, a Protocol Data Unit (PDU) modification, or a Transmit Power Control (TPC) command.

Some examples of the disclosed techniques shown in FIGS. 3-7 are further described in the following example Embodiments 1-3.

Embodiment 1

In wireless communications, techniques such as carrier aggregation (CA) have been adopted as the demand for throughput, improved user experience and wider coverage continues to increase. Carrier Aggregation provides the unique capability of aggregating several frequency bands for higher peak rates and increased cell coverage for the Fourth-Generation (4G) and the Fifth-Generation (5G) networks.

In the 5G New Radio (NR) communications, Dual-Connectivity (DC) is a feature that allows mobile devices to utilize both mid-band and mmWave frequencies to provide improved network coverage and data rate. Dual connectivity is similar to carrier aggregation, which allows mobile operators to combine two or more carriers from the same or different radio access technologies (RATs) into a single data channel to increase the capacity of the network and the data rates. The 5G NR further includes Bandwidth Part (BWP) configuration to allow dynamic adaptation of the carrier bandwidth and numerology in which a UE operates. BWP allows supporting multiple services per carrier. For example, for low load traffic (e.g., massive machine type communications), BWP switching can allow power savings at the cost of increased latency and decreased throughput.

Figure 3:
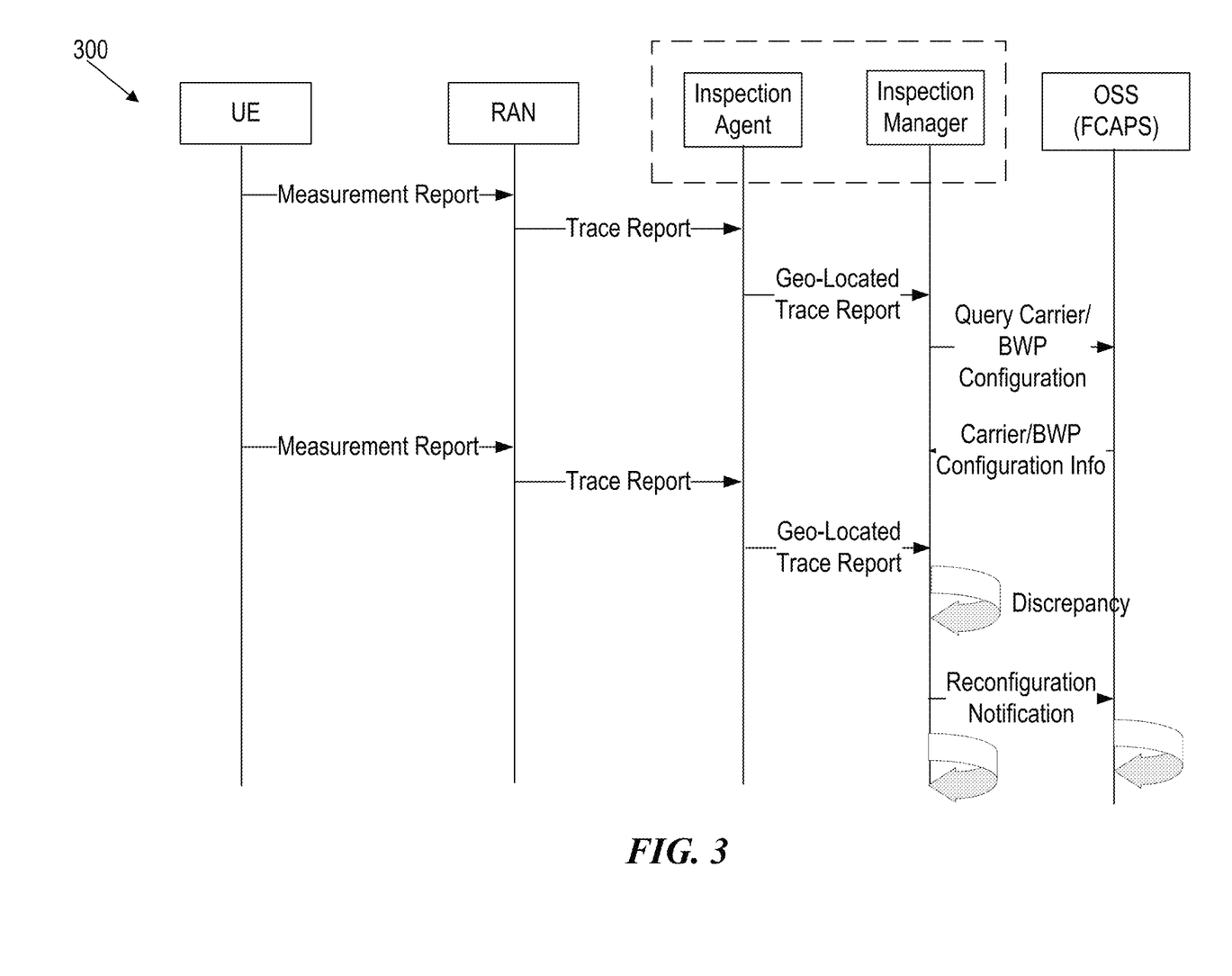
FIG. 3 illustrates an example call sequence for Carrier Aggregation reconfiguration in accordance with one or more embodiments of the present technology.

FIG. 3 illustrates an example call sequence 300 for CA reconfiguration in accordance with one or more embodiments of the present technology. The call sequence shown in FIG. 3 can also be used in other carrier and/or bandwidth related techniques, such as DC and/or BWP in 5G wireless communication. When a CA-capable UE establishes a connection with a RAN, such as an eNB in 4G networks for a gNB in 5G networks, the UE is configured to enable CA for communication with the RAN.

The UE can be configured to perform various measurements, either periodically or aperiodically, based on the mobility trigger and/or policy settings. The measurement configuration can be included in the Radio Resource Control (RRC) Reconfiguration message or the RRC Resume message. Upon being configured, the UE can perform the measurements based on reference signals and report the measurement results to the RAN. The measurement results include but are not limited to measurement results per Synchronization Signal (SS)/physical Broadcast Channel (PBCH) block and/or measurement results per Channel State Information (CSI) Reference Signal (RS).

The UE can report measurement feedback on different carriers that have been aggregated together. Each UE also performs location estimates using Global Positioning system (GPS) data. Uncorrected positions determined from GPS satellite signals produce accuracies in the range of 50 to 100 meters. When using correction techniques such as the differential correction, the position accuracy can be within 5 meters or less.

The RAN processes the feedback information received from the UE and can adjust network access configurations accordingly. The RAN also forwards the measurement results/network events (e.g., RRC reconfigurations) to the inspection agents in the core network. As shown in FIG. 3, the inspection agents that are deployed in a distributed manner close to the edge of the core network can receive trace reports (e.g., measurements, network events, etc.) from the RAN and consolidates the reported data based on estimated geo-locations using the GPS data. For example, the inspection agent can group measurement reports from UEs that are located in the same geo-location or in proximity to each other. The inspection agents can then forward the geo-located trace events to the one or more inspection managers. In some embodiments, the RAN forwards the measurement results/network events to Trace Processors so as to enable to the Trace Processors to relay the information to the core network, such as shown in U.S. patent application Ser. No. 17/562,824, filed on Dec. 27, 2021, the entire contents of which are incorporated by reference as part of the disclosure of this document.

Inspecting CA behavior can be performed by recording content of the information elements (IEs) included in the Radio Resource Control (RRC) signaling messages. For example, sCellToAddModList indicates the details for carrier to be added. As another example, the pucch-ConfigDedicated IE that is used to acknowledge the connection reconfiguration request also includes information about channel selection or other carrier related information. The CA behavior can be monitored in procedures such as UE capability discovery, secondary cell addition, RRC reconfiguration, and/or bandwidth part updates.

The inspection managers are in communication with the Operations Support Systems (OSS) or the Fault, Configuration, Accounting, Performance, and Security (FCAPS) management function to obtain network configuration information. For example, based on the geo-located trace events, the inspection manager detects that a new RAN node has been added to the network. The inspection manager then queries the OSS/FCAPS to get the CA configurations of this RAN node.

As the inspection agent(s) and the inspection manager(s) continue to receive geo-located trace events from the RANs, the inspection manager(s) may detect a discrepancy between the actual carrier behavior (e.g., derived based on the geo-located trace events/reports) and the expected carrier behavior determined based on the configuration information. For example, a RAN is configured to support CA, yet the communication traces between the RAN and the corresponding UEs indicate that only a small percentage of communication is leveraging CA. As another example, the inspection manager(s) can determine that there exists a discrepancy of BWP switching behavior for a BWP-enabled RAN when a switching level falls below a predetermined threshold for mMTC terminal devices (e.g., 80%).

Upon detecting such a discrepancy, the inspection manager can notify the OSS/FCAPS and trigger a reconfiguration of the corresponding RAN. The OSS/FCAPS, upon receiving the notification from the inspection manager, can update the status of the corresponding RAN and automatically reconfigure carriers of the RAN through other network functions in the core network. In some embodiments, the reconfiguration is performed during off-peak durations of the network to minimize impact to the network traffic and/or user experience. In some embodiments, the inspection manager can also reset or update the status of the RAN node to reflect that the RAN node has been reconfigured. For example, the inspection manager can detect that some RAN nodes have an outdated software release level and automatically proceed to upgrade them to match the network state.

Embodiment 2

Figure 4:
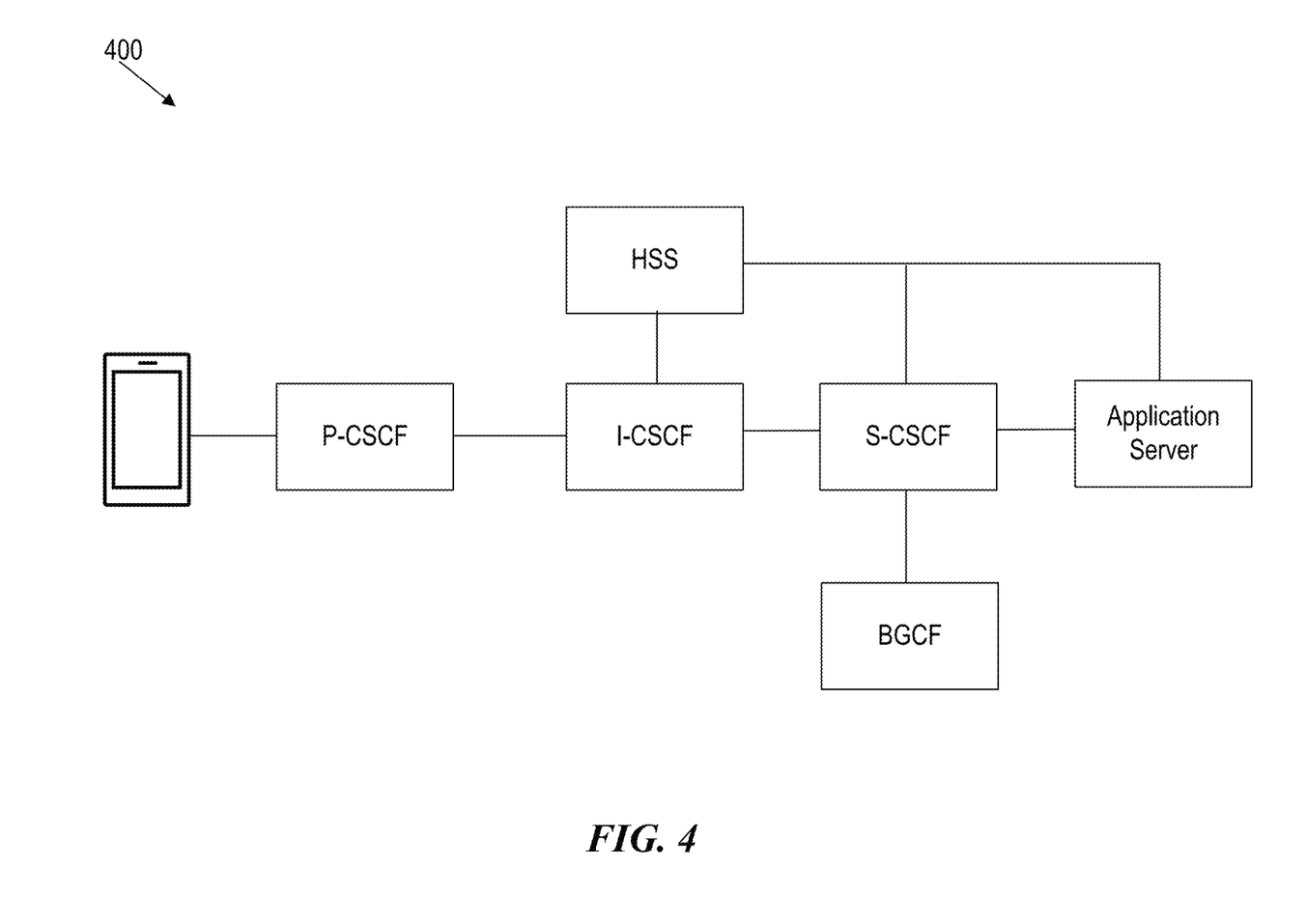
FIG. 4 illustrates an example IMS architecture.

A Voice over Internet Protocol (IP) is a technology that allows users to make voice calls using Internet connection instead of legacy phone line. In particular, Voice Over LTE (VoLTE) refers to carrying voice calls over the LTE networks via the Internet Protocol (IP) Multimedia Subsystem (IMS). In cellular networks, the IMS is an architectural framework for delivering IP multimedia services. The IMS uses the Internet Engineering Task Force (IETF) protocols, e.g., the Session Initiation Protocol (SIP), for signaling transmissions. FIG. 4 illustrates an example IMS architecture 400. Several roles of SIP servers or proxies, collectively called Call Session Control Function (CSCF), are used to process SIP signaling packets in the IMS. A Proxy-CSCF (P-CSCF) is a SIP proxy that is the first point of contact for the IMS terminal. An Interrogating-CSCF (I-CSCF) is another SIP function located at the edge of an administrative domain with its IP address published in the Domain Name System (DNS) so that remote servers can find it and use it as a forwarding point for SIP packets. A Serving-CSCF (S-CSCF) is the central node of the signaling plane. Conventionally, the S-CSCF uses Diameter Cx and Dx interfaces to the Home Subscriber Sever (HSS) to download user profiles and upload user associations.

In 5G networks, Voice Over NR (VoNR) is used to carry voice calls over the 5G networks. Take VoNR as an example, the overall VoNR call flow starts from detecting a 5G NR Cell and performing registration to 5G gNB and 5GC. A default PDU session with a particular 5G Quality of Service (QoS) indicator (5QI) value (e.g., 5QI=6–9) is established. The UE then establish a default IMS PDU session with a specified 5QI value (e.g., 5QI=5). The UE performs registration process with IMS using Session Initiation Protocol (SIP) messaging over the default IMS PDU and establish the VoNR call over a dedicated PDU session with a different 5QI value (e.g., 5QI=1). The voice traffic flows over the dedicated PDU session during the call. Once conversion is over, the VoNR call can be terminated with releasing dedicated PDU session.

Figure 5:
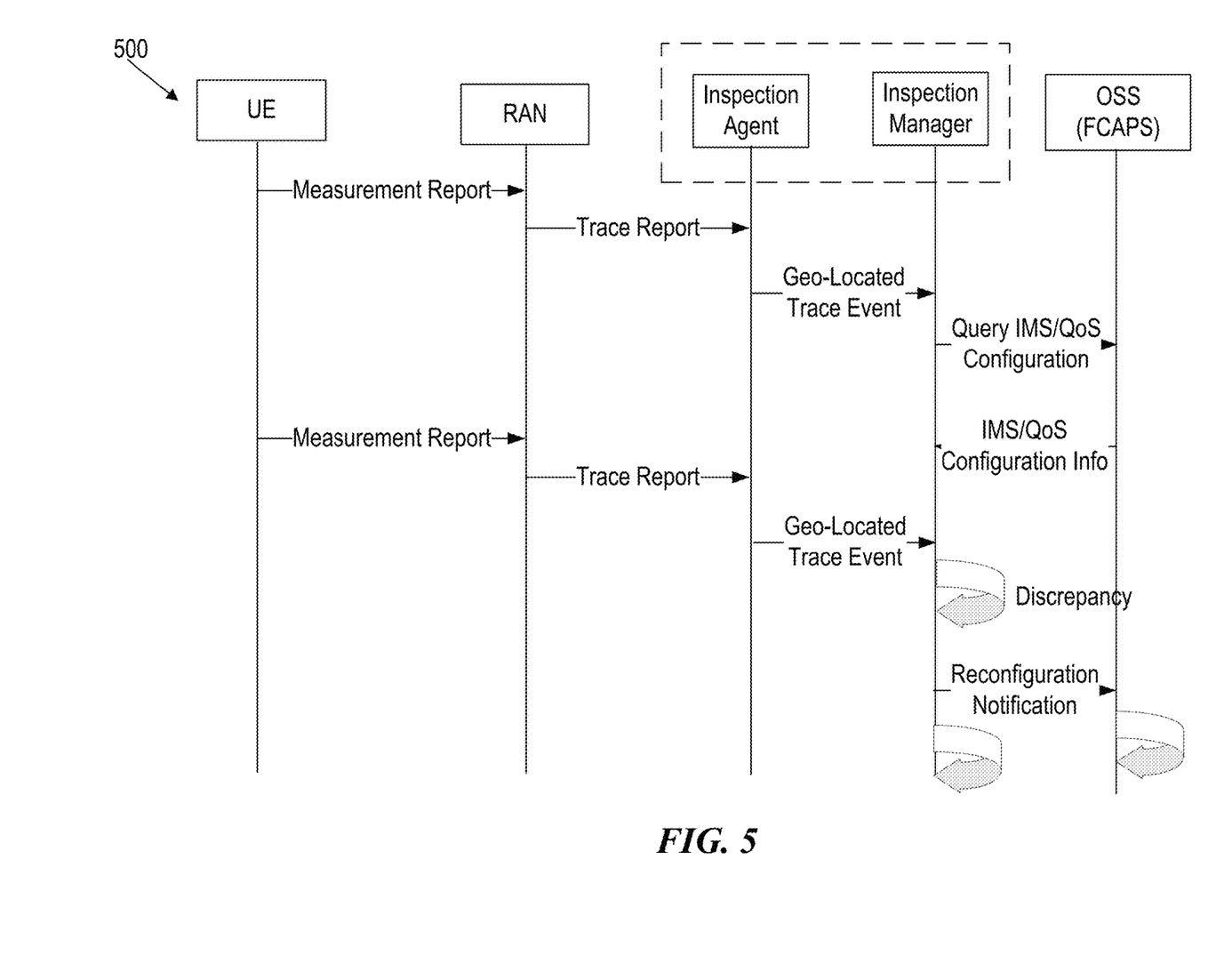
FIG. 5 illustrates an example call sequence for VoIP/IMS reconfiguration in accordance with one or more embodiments of the present technology.

Nowadays, network operators prefer handling voice calls using VoIP technology as compared to the legacy circuit switching networks. The network operator can determine whether VoIP technology is used for a voice call based on the event(s) collected in the network reports (e.g., registration, PDU session establishment). The network operator can also determine if any abnormality occurs during the call by examining PDU session parameters (e.g., 5QI value or the priority level) or SIP signaling. FIG. 5 illustrates an example call sequence 500 for VoIP/IMS reconfiguration in accordance with one or more embodiments of the present technology. When a VoIP-capable UE establishes a connection with a RAN, such as an eNB in 4G networks for a gNB in 5G networks, the UE is configured to enable VoIP for media services using IMS. Each UE also performs location estimates using Global Positioning system (GPS) data. Uncorrected positions determined from GPS satellite signals produce accuracies in the range of 50 to 100 meters. When using correction techniques such as the differential correction, the position accuracy can be within 5 meters or less.

The RAN processes the feedback information received from the UE and can adjust network access configurations accordingly. The RAN also forwards the measurement results/network events (e.g., PDU establishment, PDU modifications, QoS information) to the inspection agents in the core network. As shown in FIG. 5, the inspection agents can receive trace reports (e.g., measurements, network events, etc.) from the RAN and consolidates the reported data based on estimated geo-locations using the GPS data. For example, the inspection agent can group measurement reports from UEs that are located in the same geo-location or in proximity to each other. The inspection agents can then forward the geo-located trace events to the one or more inspection managers. In some embodiments, the RAN forwards the measurement results/network events to Trace Processors so as to enable to the Trace Processors to relay the information to the core network, such as shown in U.S. patent application Ser. No. 17/562,824, filed on Dec. 27, 2021, the entire contents of which are incorporated by reference as part of the disclosure of this document.

In order to detect and inspect VoIP usage for UEs and RAN nodes that should be engaged in VoIP services, the inspector can track the Radio Access Bearer (RAB) QoS Class Identifier (QCI) or 5QI. The QCI or 5QI are requested and accepted using the RAB Setup request/response and RRC Connection Reconfiguration messages carrying the Bearer Identifier (e.g., identifier=7 with QCI 1). Moreover, the RAN nodes reporting traces into the inspection agents not only indicate when a VoIP connection is setup but also the total tonnage (and other metrics like packet counts, burst size, delays, etc.) thereby generated typically using a periodic or summary trace message.

The inspection managers are in communication with the Operations Support Systems (OSS) or the Fault, Configuration, Accounting, Performance, and Security (FCAPS) management function to obtain network configuration information. For example, based on the geo-located trace events, the inspection manager detects that IMS/QoS configuration information for a RAN node (e.g., a new RAN node) is missing. The inspection manager then queries the OSS/FCAPS to get the configurations for this RAN node.

As the inspection agent(s) and the inspection manager(s) continue to receive geo-located trace reports from the trace processors, the inspection manager(s) may detect a discrepancy between the actual VoIP behavior and the expected VoIP behavior. For example, the network supports VoIP calls via the IMS, yet a higher-than-expected percentage of calls (e.g., 50%) still goes through the legacy circuit switching network.

Upon detecting such a discrepancy, the inspection manager can notify the OSS/FCAPS and trigger a reconfiguration of the network. The OSS/FCAPS, upon receiving the notification from the inspection manager, can automatically identify the regions/areas of the RANs that exhibit unmatching VoIP behavior and reconfigure the core network. In some embodiments, the reconfiguration is performed during off-peak durations of the network to minimize impact to the network traffic and/or user experience. If manual reconfiguration of the legacy network is needed, the precise location of the RANs and a preliminary cause of such discrepancy can be determined based on the geo-located trace reports to enable precise dispatch of the engineering teams. In some embodiments, the inspection manager can also reset or update the status of the RAN node to reflect that the RAN node has been reconfigured. For example, the inspection manager can detect that some RAN nodes have an outdated software release level and automatically proceed to upgrade them to match the network state.

Embodiment 3

Figure 6:
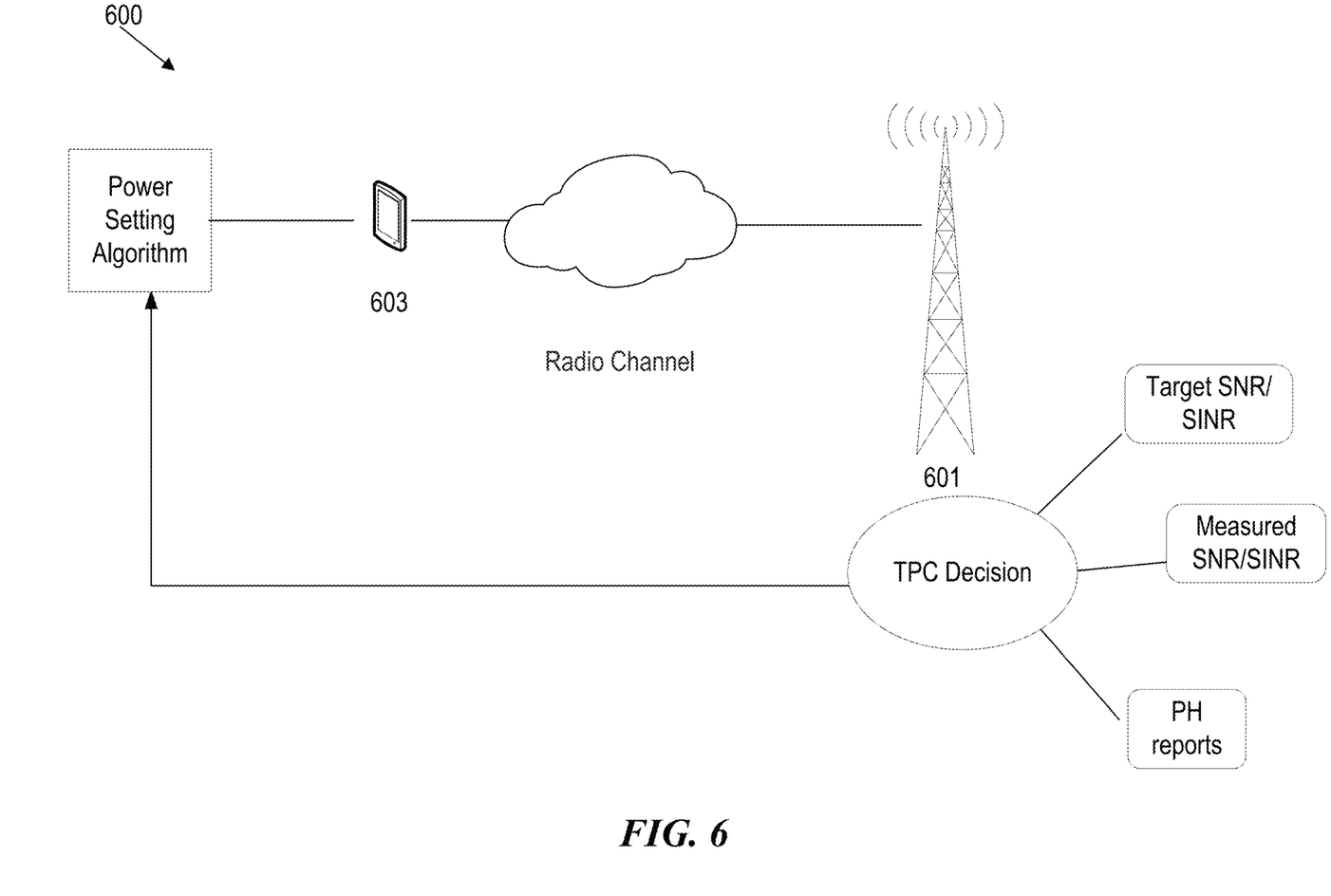
FIG. 6 illustrates an example flow for closed loop power control.

In wireless communications, there are two different ways of power control mechanisms. One is referred to as open loop power control without any feedback. The other is referred to as closed loop power control in which the UE's transmission power is controlled by feedback input from the base station. FIG. 6 illustrates an example flow 600 for closed loop power control. The base station 601 transmits one or more reference signals to the UE 603 to allow the UE 603 to measure the power of the reference signal(s). The UE 603 then reports its measurements to the base station. The base station compares the reported measurements, such as power headroom, signal to noise ratio (SNR), signal to interference and noise ratio (SINR), etc., to the target values to determine whether the power should be adjusted. The base station then sends a Transmit Power Control (TPC) command to the UE to allow the UE to change its output power dynamically.

As mentioned above, the measurement results include but are not limited to measurement results per SS/PBCH block and/or measurement results CSI-RS. In particular, SS Block is transmitted over a limited bandwidth and can be used for power measurements to estimate path loss and channel quality. However, due to limited bandwidth and low duty cycle of SS Block, the CSI-RS is more suitable for more detailed channel sounding aimed at tracking channel properties that vary rapidly in time/frequency. For example, CSI Reference Signal Received Power (RSRP) measurements can be used for connected mode mobility, power control calculations, and beam management.

Figure 7:
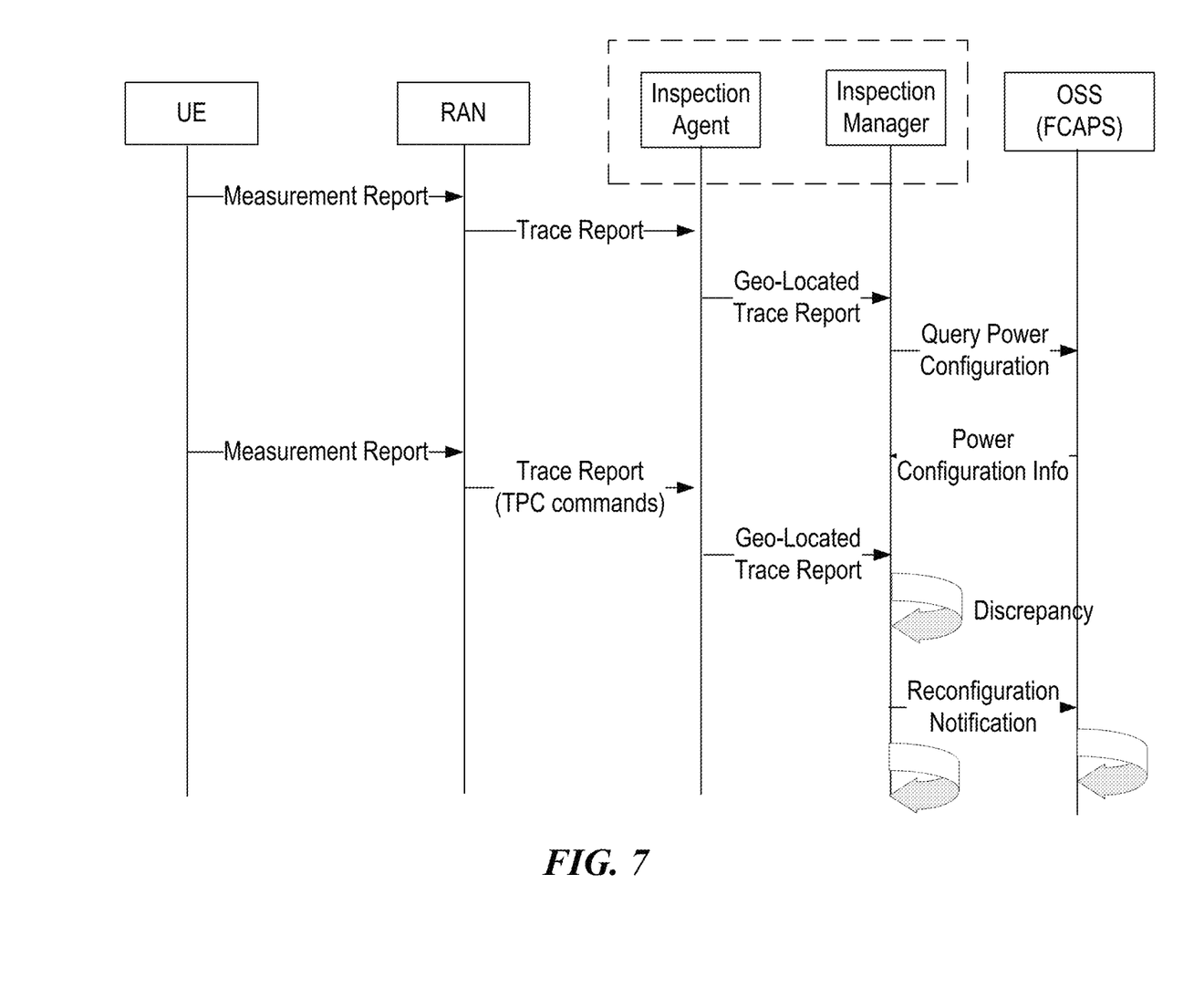
FIG. 7 illustrates an example call sequence for power reconfiguration in accordance with one or more embodiments of the present technology.

FIG. 7 illustrates an example call sequence 700 for power reconfiguration in accordance with one or more embodiments of the present technology. In this example, inspection agents can receive measurements from the UEs (via RANs) and collect power changing events upon the RANs transmitting TPC commands. In some embodiments, the RAN forwards the information to Trace Processors so as to enable to the Trace Processors to relay the information to the core network, such as shown in U.S. patent application Ser. No. 17/562,824, filed on Dec. 27, 2021, the entire contents of which are incorporated by reference as part of the disclosure of this document. The inspection agent can group trace events that are located in the same geo-location and transmit the geo-located trace events to the core network.

As the inspection agent(s) and the inspection manager(s) continuously receive geo-located trace reports from the trace processors, the inspection manager(s) may detect a discrepancy between the actual power behavior and the expected power behavior. For example, a higher or lower-than-expected power usage of the UEs can be observed. Alternatively, or in addition, power adjustments can occur more frequently than expected based on the existing power configurations. Example power configuration parameters that can be monitored include but are not limited to the maximum power per sector or antenna, the power ramp up rate (e.g., 100% or lower), the preamble signal power level, the maximum unlicensed transmission power, etc.

Upon detecting such a discrepancy, the inspection manager can notify the OSS/FCAPS and trigger a reconfiguration of the network. The OSS/FCAPS, upon receiving the notification from the inspection manager, can automatically identify the regions/areas of the RANs that exhibit unmatching power behavior and reconfigure the corresponding RAN. In some embodiments, the reconfiguration is performed during off-peak durations of the network to minimize impact to the network traffic and/or user experience. If manual reconfiguration or replacement of the power components is needed, the precise location of the RANs and a preliminary cause of such discrepancy can be determined based on the geo-located trace reports to enable precise dispatch of the engineering teams. In some embodiments, the inspection manager can also reset or update the status of the RAN node to reflect that the RAN node has been reconfigured.

Wireless Communications System

Figure 8:
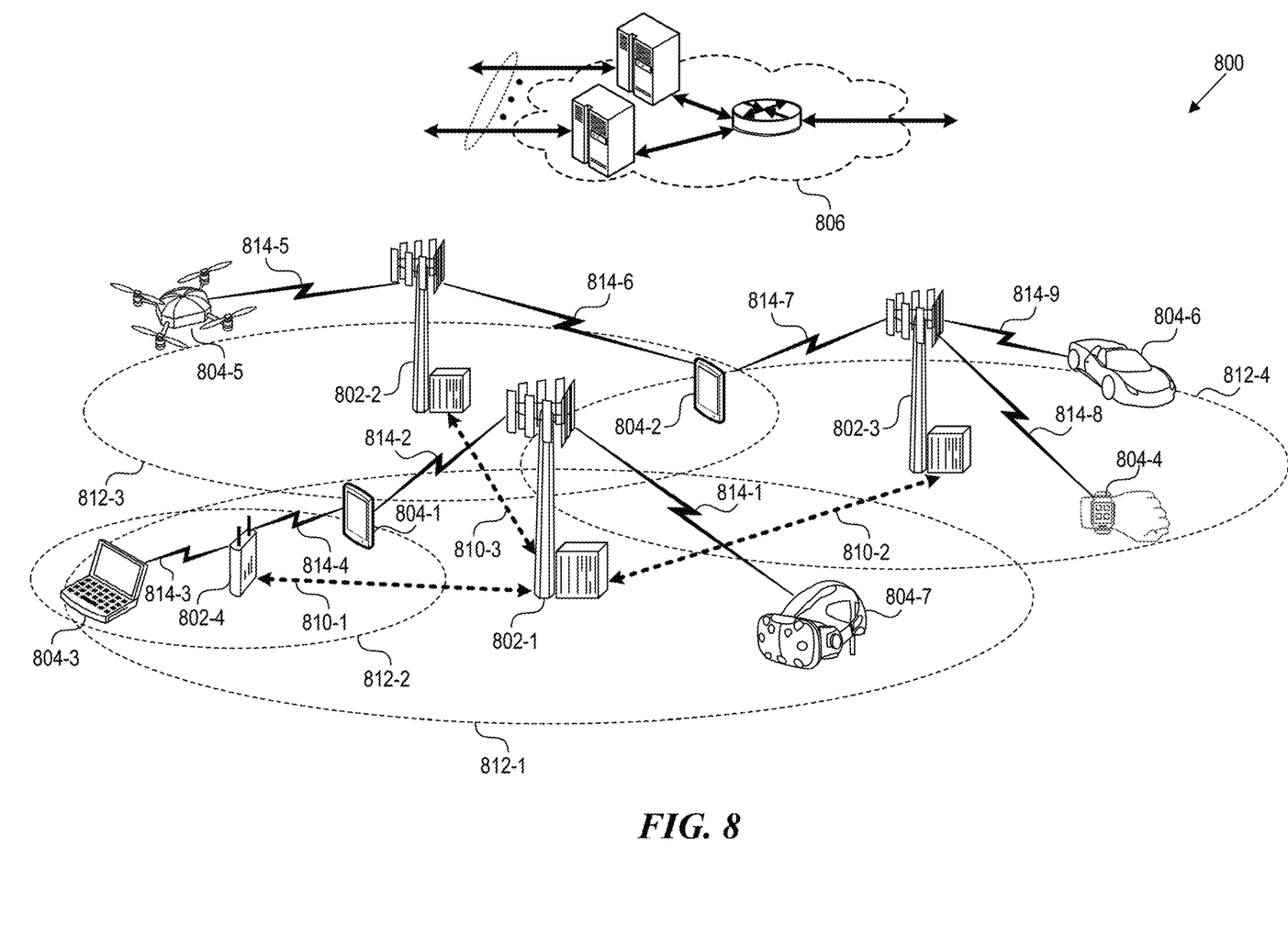
FIG. 8 is a diagram that illustrates a wireless telecommunication network in which aspects of the disclosed technology are incorporated.

FIG. 8 is a diagram that illustrates a wireless telecommunication network 800 ("network 800") in which aspects of the disclosed technology are incorporated. The network 800 includes base stations 802-1 through 802-4 (also referred to individually as "base station 802" or collectively as "base stations 802"). A base station is a type of network access node (NAN) that can also be referred to as a cell site, a base transceiver station, or a radio base station. The network 800 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 800 formed by the network 800 also include wireless devices 804-1 through 804-7 (referred to individually as "wireless device 804" or collectively as "wireless devices 804") and a core network 806. The wireless devices 804-1 through 804-7 can correspond to or include network entities capable of communication using various connectivity standards. For example, a 5G communication channel can use millimeter wave (mmW) access frequencies of 28 GHz or more. In some implementations, the wireless device 804 can operatively couple to a base station 802 over a long-term evolution/long-term evolution-advanced (LTE/LTE-A) communication channel, which is referred to as a 4G communication channel.

The core network 806 provides, manages, and controls security services, user authentication, access authorization, tracking, Internet Protocol (IP) connectivity, and other access, routing, or mobility functions. The base stations 802 interface with the core network 806 through a first set of backhaul links (e.g., 51 interfaces) and can perform radio configuration and scheduling for communication with the wireless devices 804 or can operate under the control of a base station controller (not shown). In some examples, the base stations 802 can communicate with each other, either directly or indirectly (e.g., through the core network 806), over a second set of backhaul links 810-1 through 810-3 (e.g., X1 interfaces), which can be wired or wireless communication links.

The base stations 802 can wirelessly communicate with the wireless devices 804 via one or more base station antennas. The cell sites can provide communication coverage for geographic coverage areas 812-1 through 812-4 (also referred to individually as "coverage area 812" or collectively as "coverage areas 812"). The geographic coverage area 812 for a base station 802 can be divided into sectors making up only a portion of the coverage area (not shown). The network 800 can include base stations of different types (e.g., macro and/or small cell base stations). In some implementations, there can be overlapping geographic coverage areas 812 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 800 can include a 5G network and/or an LTE/LTE-A or other network. In an LTE/LTE-A network, the term eNB is used to describe the base stations 802, and in 5G new radio (NR) networks, the term gNBs is used to describe the base stations 802 that can include mmW communications. The network 800 can thus form a heterogeneous network in which different types of base stations provide coverage for various geographic regions. For example, each base station 802 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 800 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 804 and the base stations 802 or core network 806 supporting radio bearers for the user plane data. At the Physical (PHY) layer, the transport channels are mapped to physical channels.

Wireless devices can be integrated with or embedded in other devices. As illustrated, the wireless devices 804 are distributed throughout the system, where each wireless device 804 can be stationary or mobile. For example, wireless devices can include handheld mobile devices 804-1 and 804-2 (e.g., smartphones, portable hotspots, tablets, etc.); laptops 804-3; wearables 804-4; drones 804-5; vehicles with wireless connectivity 804-6; head-mounted displays with wireless augmented reality/virtual reality (AR/VR) connectivity 804-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 804-1, 804-2, 804-3, 804-4, 804-5, 804-6, and 804-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 800 equipment at the edge of a network 800 including macro eNBs/gNBs, small cell eNBs/gNBs, relay base stations, and the like. A wireless device can also communicate with other wireless devices either within or outside the same coverage area of a base station via device-to-device (D2D) communications.

The communication links 814-1 through 814-9 (also referred to individually as "communication link 814" or collectively as "communication links 814") shown in network 800 include uplink (UL) transmissions from a wireless device 804 to a base station 802, and/or downlink (DL) transmissions from a base station 802 to a wireless device 804. The downlink transmissions can also be called forward link transmissions while the uplink transmissions can also be called reverse link transmissions. Each communication link 814 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 814 can transmit bidirectional communications using frequency division duplex (FDD) (e.g., using paired spectrum resources) or Time division duplex (TDD) operation (e.g., using unpaired spectrum resources). In some implementations, the communication links 814 include LTE and/or mmW communication links.

In some implementations of the network 800, the base stations 802 and/or the wireless devices 804 include multiple antennas for employing antenna diversity schemes to improve communication quality and reliability between base stations 802 and wireless devices 804. Additionally or alternatively, the base stations 802 and/or the wireless devices 804 can employ multiple-input, multiple-output (MIMO) techniques that can take advantage of multi-path environments to transmit multiple spatial layers carrying the same or different coded data.

Computer System

Figure 9:
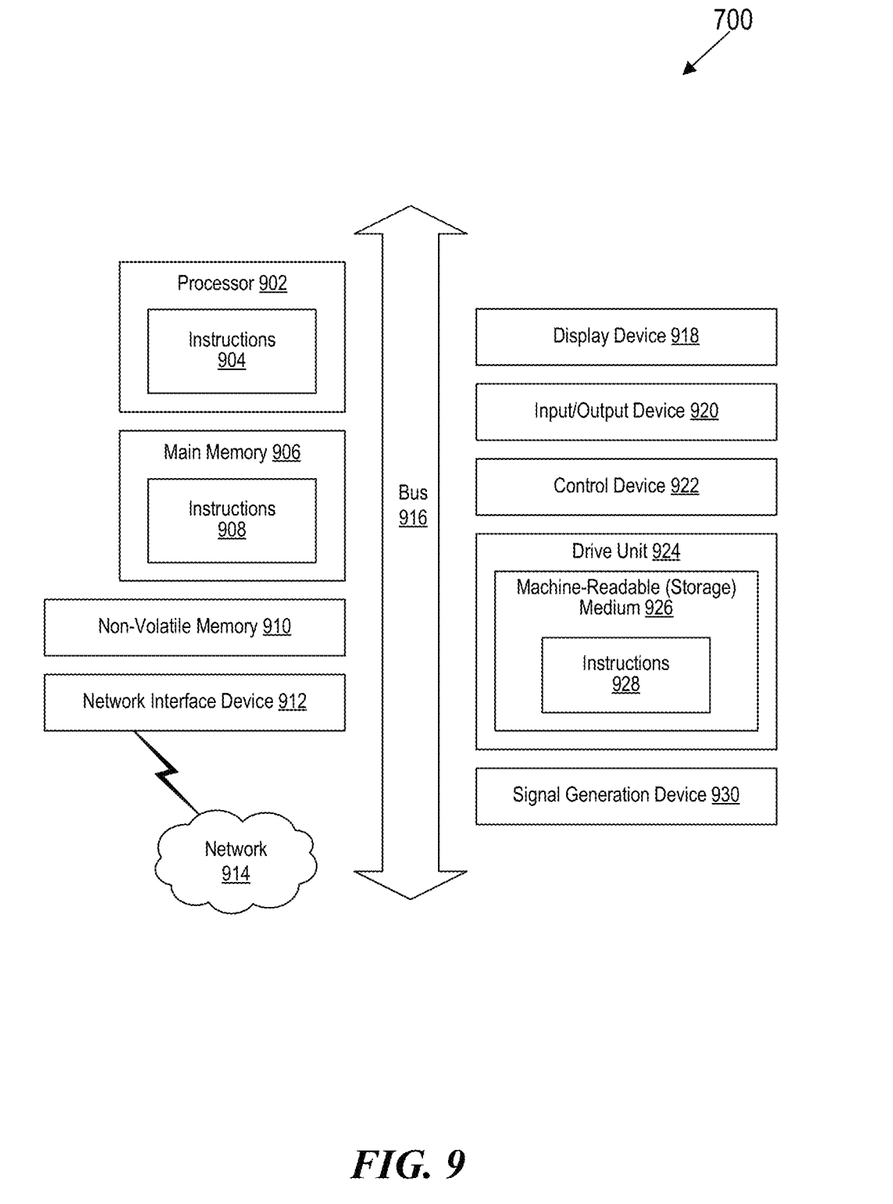
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 718, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. An inspection system deployed in a core network for wireless communications, the inspection system comprising:
   a plurality of inspection agent nodes located in the core network, each of the plurality of inspection agent nodes comprising at least one non-transitory storage medium with executable codes stored thereon and at least one processor, the at least one processor configured to receive information from one or more access nodes and generate a network report based on the information, wherein the information comprises information about network events observed by the one or more access nodes and measurements from one or more wireless devices in communication with the one or more access nodes,
      wherein each of the plurality of inspection agent nodes is further configured to:
         generate the network report from the information about the network events and the measurements based on geo-locations of the one or more wireless devices; and
         forward the network report to an inspection manager node; and
   the inspection manager node in communication with the plurality of inspection agent nodes, the inspection manager node comprising at least one non-transitory storage medium with executable codes stored thereon and at least one processor, the at least one processor configured to:
      receive the network report from the plurality of inspection agent nodes,
      derive an actual network behavior of the one or more access nodes based on the network report,
      identify, based on a network configuration, a discrepancy between an expected network behavior and the actual network behavior, and
      trigger a reconfiguration of at least one of the one or more access nodes based on the discrepancy.

2. The inspection system of claim 1, wherein the inspection manager node is further configured to:
   notify an operating support system of the discrepancy between the expected network behavior and the actual network behavior.

3. The inspection system of claim 1, wherein the reconfiguration of the at least one of the one or more access nodes is triggered at a time when data traffic is below a predefined threshold.

4. The inspection system of claim 1, wherein the actual network behavior comprises usage of one or more carriers for carrier aggregation or dual-connectivity.

5. The inspection system of claim 1, wherein the actual network behavior comprises usage of Voice of Internet Protocol (VOIP) by the one or more wireless devices.

6. The inspection system of claim 1, wherein the actual network behavior comprises power usage behavior of the one or more wireless devices.

7. The inspection system of claim 1, wherein the measurements comprise measurements performed for Synchronization Signal (SS)/physical Broadcast Channel (PBCH) block or for Channel State Information (CSI) Reference Signal (RS).

8. The inspection system of claim 1, wherein the network events comprise at least one of a Radio Resource Control (RRC) reconfiguration, a handover command, a Protocol Data Unit (PDU) modification, or a Transmit Power Control (TPC) command.

9. A method for wireless communication, comprising:
   determining, by an inspection manager node of an automated inspection system in a core network, an expected network behavior based on predefined configuration information;
   receiving, by the inspection manager node, a network report from a plurality of inspection agent nodes of the automated inspection system,
      wherein the plurality of inspection agent nodes is located in an edge of the core network in communication with one or more access nodes, the network report is generated based on information about measurements from one or more wireless devices in communication with the one or more access nodes based on geo-locations of the one or more wireless devices and network events observed by the one or more access nodes;
   deriving, by the inspection manager node, an actual network behavior based on the network report,
      wherein the actual network behavior comprises usage of one or more carriers associated with the one or more access nodes for carrier aggregation or dual-connectivity;
   detecting, by the inspection manager node, a discrepancy between the expected network behavior and the actual network behavior; and
   triggering, by the inspection manager node, a reconfiguration of at least one of the one or more access nodes based on the discrepancy.

10. The method of claim 9, further comprising:
   notifying, by the inspection manager node, an operating support system of the discrepancy between the expected network behavior and the actual network behavior.

11. The method of claim 9, wherein the triggering of the reconfiguration comprises:
   triggering the reconfiguration of at least one of the one or more access nodes in a time duration in which data traffic is below a predetermined threshold.

12. The method of claim 9, wherein the actual network behavior comprises usage of one or more carriers for carrier aggregation or dual-connectivity.

13. The method of claim 9, wherein the actual network behavior comprises usage of Voice of Internet Protocol (VOIP) by the one or more wireless devices.

14. The method of claim 9, wherein the actual network behavior comprises power usage behavior of the one or more wireless devices.

15. The method of claim 9, wherein the measurements comprise measurements performed for Synchronization Signal (SS)/physical Broadcast Channel (PBCH) block for per Channel State Information (CSI) Reference Signal (RS), and wherein the network events comprise at least one of a Radio Resource Control (RRC) reconfiguration, a handover command, a Protocol Data Unit (PDU) modification, or a Transmit Power Control (TPC) command.

* * * * *